(12) United States Patent
Volpert (10) Patent No.: US 9,829,103 B2
(45) Date of Patent: Nov. 28, 2017

(54) GEAR SHIFTING SYSTEM AND GEAR SHIFTING ELEMENT FOR A GEAR SHIFTING SYSTEM

(71) Applicant: ZF Friedrichshafen AG, Friedrichshafen (DE)

(72) Inventor: Bastian Volpert, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 164 days.

(21) Appl. No.: 14/443,781

(22) PCT Filed: Oct. 10, 2013

(86) PCT No.: PCT/EP2013/071186
§ 371 (c)(1),
(2) Date: May 19, 2015

(87) PCT Pub. No.: WO2014/075858
PCT Pub. Date: May 22, 2014

(65) Prior Publication Data
US 2015/0330506 A1     Nov. 19, 2015

(30) Foreign Application Priority Data

Nov. 19, 2012 (DE) .......................... 10 2012 221 056

(51) Int. Cl.
*F16H 63/04* (2006.01)
*F16H 63/38* (2006.01)
(Continued)

(52) U.S. Cl.
CPC ............. *F16H 63/04* (2013.01); *F16H 63/18* (2013.01); *F16H 63/304* (2013.01); *F16H 63/38* (2013.01);
(Continued)

(58) Field of Classification Search
CPC .......... F16H 63/04; F16H 63/38; F16H 63/18; F16H 63/304; F16H 2063/3083;
(Continued)

(56) References Cited

U.S. PATENT DOCUMENTS 2,577,019 A * 12/1951 Kesterton ............... F16H 63/18
74/334
8,689,656 B2 * 4/2014 Richter ................. F16H 63/304
192/53.33

(Continued)

FOREIGN PATENT DOCUMENTS

WO    WO 2011072945 A1 *  6/2011  ........... F16H 63/304
WO    WO 2012/055386 A1    5/2012

OTHER PUBLICATIONS

PCT Search Report and Written Opinion, dated Apr. 14, 2014.
German Patent Office Search Report, dated Aug. 1, 2013.

*Primary Examiner* — Victor MacArthur
(74) *Attorney, Agent, or Firm* — Dority & Manning, P.A.

(57) ABSTRACT

A gear shifting device is provided, by which an axial shift movement of a shift element into a shift position through interaction of a shift pin with an associated groove-like shift gate that is changeable in an axial direction. The shift element features, on an inner diameter and/or an outer diameter, the associated shift gate, while the respective shift pin is arranged in a radially opposite and displaceable manner on a transmission component adjacent to the shift element. As an alternative, the shift element, on an inner diameter and/or an outer diameter, accommodates the respective shift pin in a radially displaceable manner, whereas the associated shift gate for the respective shift gate is arranged to be radially opposite on a transmission component located adjacent to the shift element. The shift pin is movable through an associated actuator in a radial manner (Continued)

between an initial position and a mesh position in which each shift pin is introduced into the associated shift gate.

10 Claims, 3 Drawing Sheets

(51) Int. Cl.
 *F16H 63/18* (2006.01)
 *F16H 63/30* (2006.01)
(52) U.S. Cl.
 CPC .............. *F16H 2063/305* (2013.01); *F16H 2063/3056* (2013.01); *F16H 2063/3083* (2013.01); *F16H 2063/3093* (2013.01); *Y10T 74/20177* (2015.01)
(58) Field of Classification Search
 CPC ....... F16H 2063/3093; F16H 2063/305; F16H 2063/3056; Y10T 74/20177
 See application file for complete search history.

(56) References Cited

U.S. PATENT DOCUMENTS

| | | |
|---|---|---|
| 2001/0006921 A1 | 7/2001 | Reik et al. |
| 2012/0037472 A1 | 2/2012 | Rosemeier et al. |
| 2012/0255382 A1* | 10/2012 | Richter ................ F16H 63/304 74/333 |

* cited by examiner

GEAR SHIFTING SYSTEM AND GEAR SHIFTING ELEMENT FOR A GEAR SHIFTING SYSTEM

FIELD OF THE INVENTION

The invention relates to a gear shifting device having a first rotatably drivable transmission component on which a shift element is arranged in a torque-proof and axially displaceable manner. The shift element is axially movable into at least one shift position in which the first transmission component is coupled in a torque-proof manner with a transmission component that is arranged adjacent to it and is connectable thereon. An axial shift movement of the shift element into the shift position is by the interaction of a shift pin with an associated groove-like shift gate, which is designed to be changeable in an axial direction. The invention also relates to a shift element for a gear shifting device.

BACKGROUND

With multi-gear stage transmissions, gear shifting devices are used in order to couple transmission components of the respective transmission with each other in a torque-proof manner for the presentation of each corresponding transmission ratio relationship. Thereby, usually one shift element is assigned to a gear shifting device, which, depending on the specific arrangement, makes a friction or positive-locking coupling (e.g., a dog clutch) of the respective assigned transmission components upon actuation. Thereby, the respective shift element is typically provided, in a torque-proof and axially displaceable manner, on one of the two transmission components to be connected in a torque-proof manner, and is displaced into a respective shift position by means of an actuator system, in which the desired, torque-proof coupling is realized under the prior reduction of any possible prevailing difference in rotational speed between the two transmission components. Depending on the specific arrangement of such actuator system, such an axial shift movement of the respective shift element is thereby initiated mechanically, hydraulically, pneumatically, electrically or through mixed forms.

A gear shifting device of an automated gearbox arises from DE 196 27 980 A1, through which a first rotatably drivable transmission component can be coupled, in the form of a transmission shaft, with several transmission components that are adjacently located. In the cited case, such additional transmission components comprise gear wheels that are rotatably mounted on it. In addition, several shift elements in the form of clutch sleeves are arranged on the transmission shaft in a torque-proof and axially displaceable manner, whereas each of the clutch sleeves is composed of a ring-shaped body, which is provided on an inner circumference with an axially running toothing and is guided through such toothing to a corresponding toothing on the sides of the radial inner transmission shaft.

Each of the sliding sleeves may now, in each case, move axially between a neutral position, in which the respective sliding sleeve does not couple any of the two gear wheels, located axially on both sides, with the transmission shaft, and two shift positions in which, in each case, the transmission shaft is coupled in a torque-proof manner with one gear wheel under the prior reduction of a difference in rotational speed. Thereby, in the present case, the axial shift movements of the individual sliding sleeves are presented through an electric motor, intermediate transmission ratio stages, and a shift drum in interaction with a shift fork assigned to the individual clutch sleeves. Thereby, through the electric motor, by means of the intermediate transmission ratio stages, this brings about, on the one hand, an opening of the separating clutch upstream of the transmission shaft and, on the other hand, a corresponding turning of the shift drum at the same time.

The shift drum is provided on a radial outer side with groove-like shift gates, which are designed to have a changeable axial course, at least in sections, and in which one shift pin of the respective shift fork runs. If the shift drum is set in rotational motion through the electric motor by means of intermediate transmission ratio stages, the course changeable in an axial direction of the respective shift gate, through the shift pin running thereon, brings about an axial sliding movement of the respective shift fork, which is translated into a corresponding axial displacement of each associated clutch sleeve on the transmission shaft. As a result, the respective clutch sleeve is moved axially between its respective neutral position and one of the possible shift positions. Thereby, the shift gates on the shift drum are designed to be changeable in an axial direction in such a manner that, upon a constant rotational motion initiated by the electric motor, a sequential shifting of the individual gears of the automated gearbox takes place with the respective open separating clutch.

SUMMARY OF THE INVENTION

Based on the state of the art described above, it is a task of the present invention to make available a gear shifting device, through which at least one shift movement of a shift element for the torque-proof coupling and/or separation of the two transmission components that are otherwise able to be turned relative to each other can be realized with a compact structure. Additional objects and advantages of the invention will be set forth in part in the following description, or may be obvious from the description, or may be learned through practice of the invention.

The tasks are solved on the basis of the invention as described and claimed herein.

In accordance with the invention, a gear shifting device comprises a first, rotatably drivable transmission component, on which a shift element is arranged in a torque-proof and axially displaceable manner, which can be axially moved into at least one shift position. In this at least one shift position, the first transmission component is thereby coupled in a torque-proof manner with a transmission component that is connectable thereon, which is arranged adjacent to the first transmission component and is otherwise able to be turned relative to it. In addition, an axial shift movement of the shift element into the at least one shift position and/or from this through the interaction of one shift pin is able to be triggered with at least one associated groove-like shift gate, which is designed to be changeable in an axial direction, at least in sections.

Within the meaning of the invention, a "transmission component" is generally understood to mean a rotatable or stationary component of the transmission, such as a transmission shaft, a gear wheel, a housing or a housing part, etc. In particular, at least upon the shifting of individual gears of the transmission, the respective transmission component is involved in the power transmission between an input side and an output side of the transmission. While the first transmission component must necessarily concern a rotatably drivable transmission component, such as a transmission shaft or a gear wheel of a transmission ratio stage in accordance with the invention, the transmission that is located adjacent to it and is connectable thereon may likewise either be designed as a rotatably drivable transmission component, thus for example as a transmission shaft, or present as a rotatably mounted spur gear, or even as a stationary component in the form of a transmission housing or a part of a transmission housing. In the case of the first variant, the two transmission components then rotate together after the torque-proof coupling, while, in the latter case, the first transmission component is, with a torque-proof connection, fixed to it with a connectable transmission component.

Within the meaning of the invention, the shift element may be directly involved in the torque-proof connection of the first transmission component to the connectable transmission component, by, with its axial displacement in the respective shift position, it being in contact with the connectable transmission component itself, thus itself transferring a torque from the first transmission component to the connectable transmission component. Thereby, the connectable transmission component for the torque-proof coupling can be provided with an additional component, for example in the form of a coupling body, with which the shift element of the first transmission component is, upon its transfer, in torque-proof contact in the shift position. As an alternative to this, however, the additional connectable transmission component is provided with its own shift element, which is likewise provided in a torque-proof and axially displaceable manner on the sides of the connectable transmission component and is to be moved for the torque-proof coupling of the transmission components at the same time with the shift element provided on the sides of the first transmission component in an associated shift position.

However, as an alternative to the options specified above, the shift element may be a component that does not directly carry out the coupling of the two transmission components, but only initiates this torque-proof coupling, without thereby itself transferring a torque. Thus, a design of the shift element as sliding piston is conceivable, which, upon a transfer into a shift position, additional components connected to the transmission components to be coupled, such as two multi-disk sets of a multi-disk pack, press together, and this brings about the coupling of the transmission components.

Finally, the gear shifting device in accordance with the invention may either be designed as a simple shifting device, with which the associated shift element is able to move from a neutral position only into a shift position, or realized as a dual shifting device, with which the associated shift element may be axially displaced from the neutral position, both in a first direction and in a second direction, into a shift position, and thereby makes a torque-proof coupling of the first transmission component with a connectable transmission component that is located adjacent to it. Furthermore, within the framework of the invention, an arrangement is also conceivable, with which there can only be a change between two shift positions; thus, a neutral position of the shift element is not possible.

In accordance with the invention, a shift element of a gear shifting device particularly features a ring-shaped body, which is provided on an inner circumference with an axially running toothing, through which the body can be guided, in a torque-proof and axially displaceable manner, through a corresponding toothing to a radial inner transmission component. It is particularly preferable that the ring-shaped body forms a circular ring and is formed by an individual element, whereas, in principle, within the framework of the invention, an assembly of the body from several individual parts is conceivable. Such individual parts are then connected to each other at least in a torque-proof manner.

In principle, the shift element in accordance with the invention may also be arranged in such a manner that, in a gear shifting device, upon an axial displacement into a shift position, a positive-locking or force-fitting (i.e., friction) coupling of the two transmission components is brought about. Such shift element may be designed as a claw sleeve of a claw coupling or claw brake, as a sliding sleeve of a block synchronization, or a similarly structured component, which, after a reduction of any possible difference in rotational speed between the two transmission components, makes the positive-locking coupling. Thereby, a reduction in the difference in rotational speed is either accomplished purely through a tooth meshing of the shift element with an element provided on the sides of the additional transmission component or brought about with the assistance of intermediate components, such as synchronizer rings. In addition, the shift element may also comprise a sliding piston that, when it is displaced, presses together the clutch halves of a force-fitting clutch or brake, such as a multi-disk clutch or brake.

The invention includes the technical teaching that the shift element features, on an inner diameter and/or an outer diameter, at least one associated shift gate, while the respective shift pin is arranged in a radially displaceable manner, and the at least one shift gate is arranged in a radially opposite manner, to the transmission component adjacent to the shift element. As an alternative or in addition to this, the shift element, on a radial inner diameter and/or a radial outer diameter, accommodates the respective one shift pin in a radially displaceable manner, whereas the at least one associated shift gate for the respective shift pin is arranged to be radially opposite to a transmission component located adjacent to the shift element. In addition, the respective shift pin may be moved through an associated actuator, in each case radially between an initial position and a mesh position, in which it can be introduced into the associated shift gate.

In other words, in each case, the shift pin and the associated groove-like shift gate are provided radially opposite between the shift element and a transmission component located adjacent to this. On the one hand, one of these two components, thus either the shift pin or the shift gate, is thereby provided on an inner diameter or an outer diameter, whereas the other element is, conversely to this, placed on a radial outer side or a radial inner side of the adjacent transmission component. If various axial shift movements of the shift element are initiated by such an interaction, depending on the shift pin, with at least one associated shift gate, on the sides of the shift element and one or various radially adjacent transmission components, several pairs of a shift pin and a shift gate can be provided. If there are several such pairs, different combinations are conceivable, with which the shift element, on its inner diameter and/or also on its outer diameter, accommodates several shifting pins, several shift gates or at least one shift pin and at least one shift gate. Thereby, in each case, the elements thereby opposite to these can only be provided on only one adjacent transmission component or on different adjacent transmission components, but necessarily must be arranged to be radially opposite.

The associated axial shift movement is triggered by the fact that the respective shift pin radially movable through the associated actuator is introduced into the associated shift gate, such that, in accordance with the course changeable in an axial direction, an axial displacement of the shift element relative to the transmission component that is adjacently located is brought about. Since this axial shift movement takes place initially upon the radial displacement of the respective shift pin from the initial position into the mesh position, this axial shift movement of the shift element can be selectively initiated through the actuator. At the same time, the arrangement of the shift pin with the actuator and the provision of the shift gate in compact form is possible. Preferably, the actuator thereby comprises an electrical actuator, such that, compared to a mechanical or a hydraulic actuator system, the control of the shift element is possible with low weight and a low need for installation space. As a whole, the gear shifting device in accordance with the invention can be realized in the area of a transmission in a manner that saves space, whereas it is also the case that several shift elements can be controlled easily and independent of each other through a gear shifting device that is so designed.

In contrast to this, with DE 196 27 980 A1, the shift pins provided on the sides of the shift forks run permanently in the associated shift gates, which are arranged on the radial outer side of the shift drum. As a result, the individual shift element may not be individually displaced from a neutral position into a shift position, since axial shift movements of the shift elements are always rigidly carried out according to the turning of the shift drum and the respective design of the shift gates. Thus, the shifting of the gears of the automatic vehicle transmission of DE 196 27 980 A1 is effected in accordance with a rigidly predetermined shifting sequence, such that, for example, a skipping of one or more gears is not possible. Thus, this structure is suitable only for use with an automated transmission. In addition, the housing of the actuator system composed of an electric motor, transmission ratio stages, and a shift drum requires a corresponding installation space, such that, in the case of DE 196 27 980 A1, a compact actuation of the shift elements is not possible.

In the present case, it is clear to the specialist that, with the gear shifting device in accordance with the invention, for the initiation of an axial movement of the shift element up to its transfer into the shift position, a relative rotational speed between the component bearing the shift pin and the component provided with the groove-like shift gate is always required, since, otherwise, the enclosing of the shift pin in the associated shift gate is not translated into an axial sliding movement. This has the consequence that, when the first transmission component is at rest, a shift movement of the shift element cannot be carried out, to the extent that the opposing transmission component, which features either the respective shift pin or the associated shift gate, performs a rotational motion. Furthermore, a gear shifting device in accordance with the invention is to be provided at least with start-up gears on the input side, since, at the beginning of a start-up procedure of the motor vehicle, the output side of the respective motor vehicle transmission is at a standstill. Generally, however a gear shifting device in accordance with the invention can easily be used with all stage transmissions and thereby in particular with motor vehicle transmissions.

According to one embodiment of the invention, the respective shift pin and the associated actuator are provided at a housing placed in a manner that radially surrounds the shift element. The provision of the shift pin(s), along with the actuator(s) on the sides of a housing, thereby has the advantage that such components are thus provided on the sides of a stationary part, and thus the feed of control lines to the associated actuator may be simply arranged. Thus, in the case of the arrangement of the actuator as an electronic actuator, electric wires may be easily led into the area of the actuator. In addition, the arrangement of the respective shift pin on the sides of the housing results in the fact that, upon rotation of the first transmission component, there is always a relative rotational speed between the respective shift pin and the shift gate provided on the sides of the shift element. Apart from this, however, the respective shift pin and the associated actuator may also be provided on the sides of the rotatable shift element or on a rotatable transmission component, whereas control and supply lines of the actuator are then to lead to the respective rotating component.

In an additional form of the aforementioned variant, the housing bears a first and a second shift pin, which are each movable in a radial manner by a common actuator and which, upon the transfer into its respective mesh position, is enclosed in the respective assigned first or second shift gate. The two shift gates are thereby introduced in the outer diameter of the shift element and are arranged to run opposite to each other, whereas, through the enclosing of the first shift pin in the first shift gate, a shift movement of the shift element from a neutral position into the shift position can be brought about, whereas, by means of the introduction of the second shift pin in the second shift gate, a return movement from the shift position into the neutral position can be presented. Thereby, an axial movement of the shift element through one of the shift pins from the neutral position into the shift position and through the other shift pin from such shift position back into the neutral position can be presented.

Thereby, the course of the two shift gates arranged to run opposite to each other is to be selected in such a manner that, in the neutral position of the shift element, the first shift pin may be enclosed in the associated first shift gate, while, in the shift position of the shift element, the second shift pin can be introduced into the associated second shift gate. Preferably, the two shift gates are thereby introduced into the outer diameter of the shift element in such a manner that each of the shift gates passes steadily on its respective two ends through the transition areas into the outer diameter of the body. Thereby, the respective shift pin can then cleanly enter the associated shift gate, if such shift pin and the beginning of the shift gate are not initially overlapped in a circumferential direction at the beginning of the transfer of the shift pin into the mesh position.

According to an additional arrangement of the invention, the shift element is provided on at least one axial front side with an axially protruding and revolving claw toothing, which is thereby turned towards an additional transmission component. In addition, the additional transmission component is connected in a torque-proof manner to a coupling body provided axially between the transmission component and the shift element. The coupling body is provided on a front side turned towards the shift element with a toothing designed in a corresponding manner to the claw toothing of the shift element, and is coupled, in an axially displaceable manner, with the additional transmission component through an intermediate spring element. In this case, the shift element is designed as a claw sleeve, which, in the shift position of a positive-locking coupling of the first transmission component, is presented with the additional transmission component by means of a tooth meshing with the coupling body.

Thereby, the placement of a spring element between the coupling body and the additional transmission component has the advantage that any shock that arises upon the tooth meshing of the shift element with the coupling body is not transferred to the additional transmission component, but is compensated through the intermediate spring element. However, within the meaning of the invention, a toothing provided on the shift element is also arranged on the front side of the shift element and on a radial outer side, whereas the toothing corresponding to this is to be accordingly provided on the sides of the coupling body, on the front side, and on an inner circumference of the coupling body. In principle, it is also conceivable within the framework of the invention to provide the coupling body not as a separate element that is coupled with the additional transmission component through a spring element, but to rigidly connect this to the additional transmission component or to also directly provide the additional transmission component with the corresponding toothing. This reduces production costs, but shock compensation is not enabled.

In an additional form of the invention, at least one locking device is provided radially between the shift element and the first transmission component, which, apart from axial shift movements, prevents axial movements of the shift element from a neutral position and the at least one shift position. In other words, a locking device is accommodated between the shift element and the first transmission component, which prevents the axial movements of the shift element that are not brought about through the meshing of the respective shift pin in the associated shift gate. This has the advantage that, after the transfer of the shift element into the shift position or into the neutral position, the respective shift pin need not remain in the shift gate in order to hold the shift element in this position. Instead, the locking device provides for the shift element remaining in the desired position.

An additional form of the aforementioned variant provides that the at least one locking device comprises a ball, which is guided, in a radially movable manner, on the sides of the first transmission component or the shift element, and is preloaded against a locking contour by means of a spring element. Thereby, the locking contour is designed in a manner radially opposite to the ball at the shift element or the first transmission component and arrives both in the neutral position and in the at least one shift position of the shift element, in each case with a locking recess axially in an overlap with the ball. Through the design of the locking device as a ball locking mechanism, the desired fixing of the shift element in the neutral position and in the shift position can be realized in a simple manner. However, within the meaning of the invention, it is also conceivable to provide a locking device between the shift element and another transmission component, for example, a surrounding housing.

According to an additional embodiment of the invention, in each case, the first transmission component and the additional transmission component provided adjacent to it comprise a transmission shaft. Consequently, these two transmission components can be coupled with each other in a torque-proof manner through the gear shifting device in accordance with the invention.

The invention is not limited to the specified combination of characteristics of the equivalent claims or any of the claims dependent on them. There are also options for combining individual characteristics with one another, and as they arise from the claims, the following description of one embodiment of the invention or directly from the FIGURES. Any reference of the claims to the drawings through the use of reference signs should not restrict the scope of protection of the claims.

BRIEF DESCRIPTION OF THE DRAWINGS

Additional measures that improve the invention are shown in more detail below, together with the description of a preferred embodiment of the invention, which makes reference to the drawings shown in the FIGURES. The following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1A:
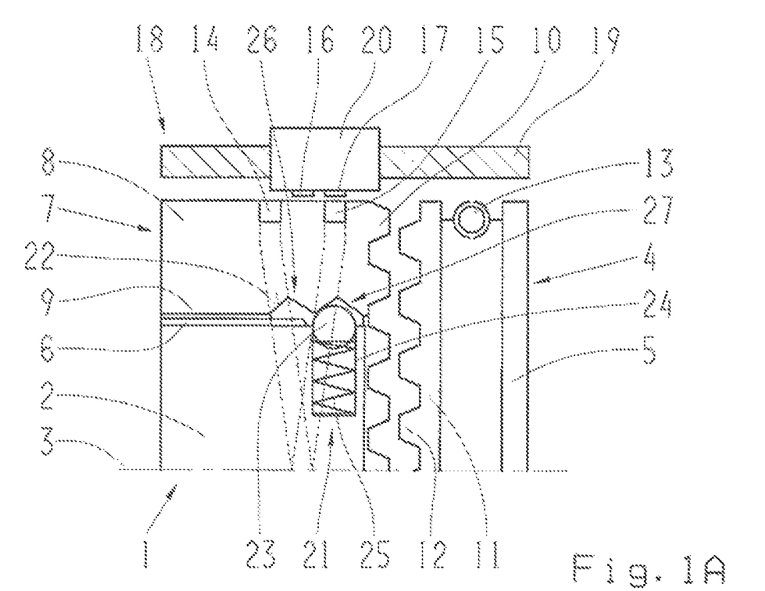
FIGS. 1A to 1F are schematic views of a gear shifting device according to a preferred embodiment of the invention, shown in different shifting states of the gear shifting device.

Each of FIGS. 1A to 1F shows a schematic view of a gear shifting device in accordance with a preferred embodiment of the invention, whereas, through FIGS. 1A to 1F, individual shifting states of this gear shifting device are thereby presented. In the following, the structure of the gear shifting device is to be initially described on the basis of FIG. 1A:

The gear shifting device shown in FIG. 1A comprises a shifting device of a stage transmission, for example in the form of an automated car transmission. Thereby, this gear shifting device comprises a first transmission component 1, which in the present case is designed as a transmission shaft 2 of the manual transmission and can be set in rotation around the axis of rotation 3. Furthermore, an additional transmission component 4 that is located adjacent to the first transmission component 1 is provided in a manner coaxial to the transmission shaft 2 and likewise rotatable around the axis of rotation 3; in the present case, this is likewise arranged in the form of a transmission shaft 5. Through the gear shifting device in accordance with the invention, the transmission shaft 2 and the transmission shaft 5 can now be coupled with each other in a torque-proof manner.

As can also be seen in FIG. 1A, the transmission shaft 2 features, on a radial outer side, a synchronization toothing 6, through which the transmission shaft 2 guides a shift element 7 set radially on the outside of the transmission shaft 2 in a torque-proof and axially displaceable manner. Thereby, such shift element 7 is designed with a ring-shaped body 8, which in the present case is arranged in one piece and, on an inner circumference, is provided with a toothing 9 corresponding to the synchronization toothing 6. If there is a simultaneous axial displacement capability, the torque-proof arrangement of the shift element 7 on the transmission shaft 2 is thereby realized by the course of the teeth of the synchronization toothing 6 and the toothing 9 that is oriented in an axial direction.

Moreover, on a front side turned towards the transmission shaft 5, the shift element 7 is provided with a claw toothing 10, the teeth of which thereby protrude in an axial manner in the direction of the transmission shaft 5 and is formed in a revolving manner on the shift element 7. A toothing 12 is arranged axially opposite to this claw toothing 10, on a coupling body 11, whereas this toothing 12 protrudes in an axial manner in the direction of the shift element 7 and is designed in a corresponding manner to the claw toothing 10 of the shift element 7. The coupling body 11 is thereby formed as a separate component that also rotates around the axis of rotation 3, which is thereby coupled with the transmission shaft 5 in a torque-proof and axially displaceable manner. Thereby, in an axial manner between the coupling body 11 and the transmission shaft 5, a spring element 13 is provided, which is formed in a rigid manner in a circumferential direction and radial direction. The spring element 13 allows for relative movements between the coupling body 11 and the transmission shaft 5 in an axial direction, and thereby preloads the coupling body 11 in respect of the transmission shaft 5 in the direction of the shift element 7.

In order to now selectively present an axial movement of the shift element 7 from the neutral position shown in FIG. 1A into a shift position, in which the claw toothing is in tooth meshing with the toothing 12, and back, the shift element 7 is provided, on an outer diameter of its body 8, with two shift gates 14 and 15, which, in the interaction with an associated shift pin 16 or 17, may in a targeted manner initiate the respective axial displacement of the shift element 7. The shift pins 16 and 17 are thereby provided on the sides of a transmission component 18 that is radially adjacent to the shift element 7, and in the present case, comprises a radially enclosing housing 19 of the transmission. Thereby, each of the shift pins 16 and 17 can be displaced from an initial position shown in FIG. 1A into a respective mesh position, in which the respective shift pin 16 or 17 may be radially enclosed in the associated shift gate 14 or 15. For this purpose, the two shift pins 16 and 17 are accommodated in an actuator 20 in a radially displaceable manner, which is likewise provided on the housing 19. In addition, the actuator 20 is designed as an electrical actuator, through which, upon a corresponding power supply, the respective desired radial movement of the respective shift pin 16 or 17 may be selectively initiated.

As can also be seen in FIG. 1A, the shift gates 14 and 15 have a changeable course in an axial direction, whereas each of the courses of these sections of the shift gate 14 and 15 thereby has a spiral-shaped character. In addition, such courses, as can be seen based on the dashed continuation of the shift gates 14 and 15, are designed to be opposite to each other, such that, in the interaction with the shift pins 16 and 17, the differently oriented axial shift movements of the shift element 7 can be realized.

Furthermore, each shift gate 14 or 15 is equipped on the input side with a transition area (which is not shown in the present case), through which the outer diameter of the ring-shaped body 8 passes into the respective groove-like shift gate 14 or 15. In addition, at an end of the respective shift gate 14 or 15 opposing this, a transition area is likewise provided; this is likewise not shown in the present case and, through this, the respective shift gate 14 or 15 tapers off back to the outer diameter of the ring-shaped body 8. Thereby, in the neutral position of the shift element 7, the transition area on the input side of the shift gate 15 is located in an axial manner at the level of the shift pin 17 and the transition area of the output side of the shift gate 14 in an axial manner at the level of the shift pin 16, while, conversely to this, in the shift position of the shift element 7, the transition area on the output side of the shift gate 15 is axially overlapped with the shift pin 17, and the transition area on the input side of the shift gate 14 is axially overlapped with the shift pin 16.

Furthermore, in a radial manner between the transmission shaft 2 and the shift element 7, a locking device 21 is provided, which is composed of a locking contour 22 and a ball 23 running on it. The ball 23 is guided on the sides of the transmission shaft 2 in a radially movable manner into a boring 24, and is preloaded against the locking contour 22 by means of a spring element 25, which is provided on the radial inner side of the ring-shaped body 8 of the shift element 7 and defines two locking recesses 26 and 27.

Thereby, the locking recess 27 arrives in the neutral position of the shift element 7 with the ball 23 in an axial manner in the overlap, whereas the ball 23 is pressed in the shift position of the shift element 7 through the spring element 25 into the locking recess 26. Thereby, the locking device 21 prevents the shift element 7 from remaining in the neutral position or in the shift position, apart from the axial movements of the shift element 7 brought about by the shift pins 16 and 17 and the shift gates 14 and 15.

Figure 1B:
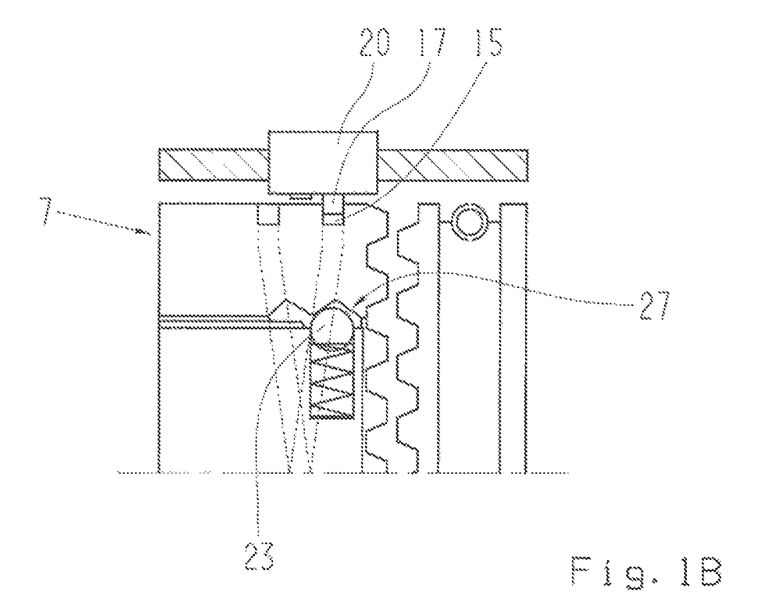

In the following, with reference to FIGS. 1A to 1F, a shift movement of the shift element 7 from the neutral position to be seen in FIG. 1A into the shift position and back into the neutral position is to now be described:

In order to initially move the shift element 7 from the neutral position shown in FIG. 1A into the shift position, in which the claw toothing 10 is in tooth meshing with the toothing 12, initially in a first step, the shift pin 17 moves by means of the actuator 20 radially from the initial position shown in FIG. 1A into a mesh position emerging from FIG. 1B, in which the shift pin 17 is enclosed in the associated shift gate 15. If the shift gate 15 and the shift pin 17 do not overlap in a circumferential direction when actuating the shift pin 17, the shift pin 17 initially makes contact on the outer diameter of the shift element 7, until ultimately it can be slid into this through the transition area of the second shift gate 15. In the following, the course of the shift gate 15 changeable in an axial direction brings about the fact that, based on the fixed position of the shift gate 17, an axial displacement of the shift element 7 is forced. Thereby, in the course of this axial displacement, the ball 23 also slides out of the locking recess 27.

Subsequently, the shift element 7 is displaced from the axial position shown in FIG. 1B into the position shown in FIG. 1C, which corresponds to the shift position of the shift element 7. Along this path, in this shift element, the claw toothing 10 of the shift element 7 meshes with the toothing 12 of the coupling body 11, whereas any shock that thereby arises is compensated by the spring element 13. Upon reaching the shift position of the shift element 7, the shift pin 17 is then moved back through the respective transition area from the shift gate 15 into the initial position seen in FIG. 1D.

Figure 1C:
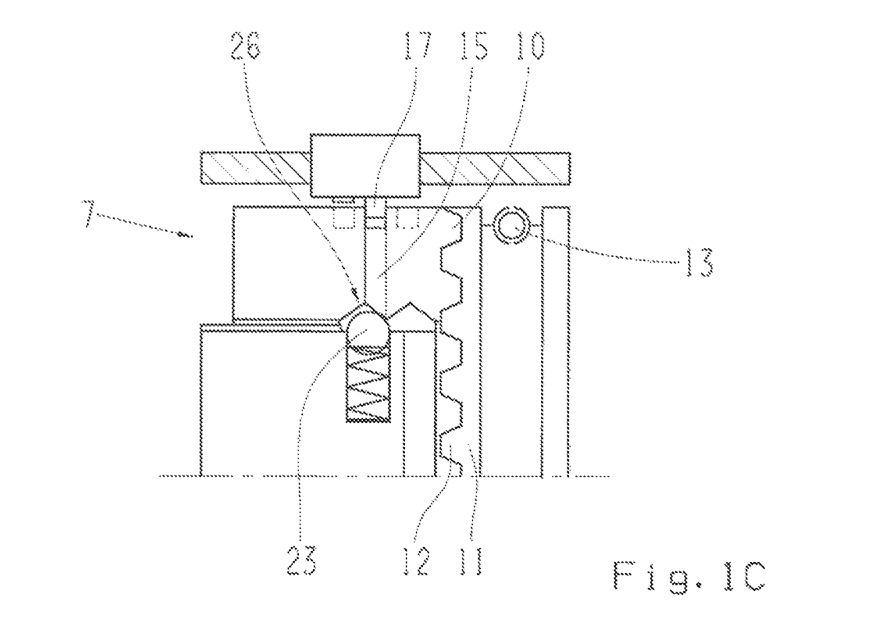
Figure 1D:
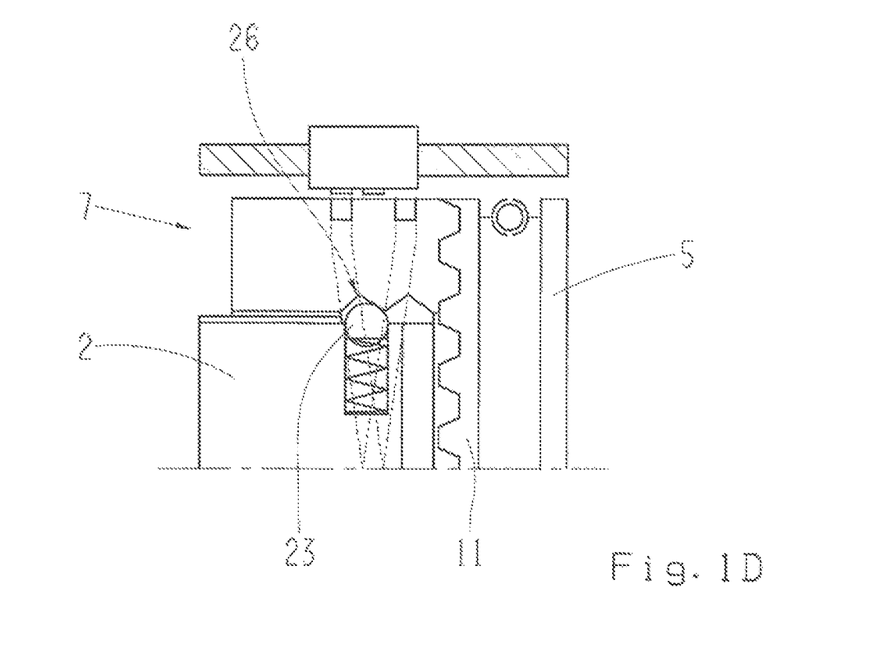

In FIG. 1C and FIG. 1D, the ball 23 also arrives in the overlap with the locking recess 26, which prevents the shift element 7 from unintentionally exiting the shift position. In the shift position of the shift element 7, the transmission shaft 2 and the transmission shaft 5 are now coupled in a torque-proof manner with each other through the shift element 7 and the coupling body 11.

Figure 1E:
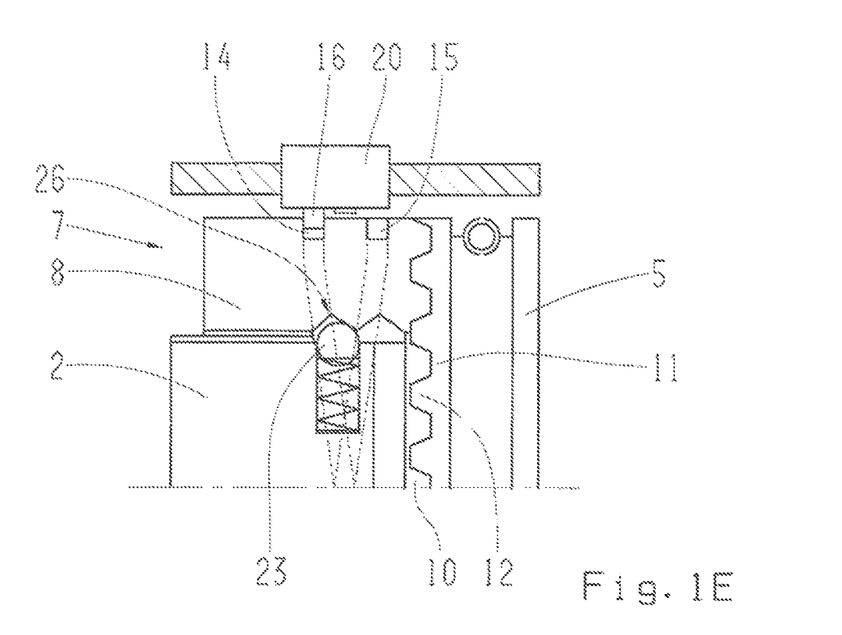

For the return movement of the shift element 7 into its neutral position, upon a step following this, as shown in FIG. 1E, the shift pin 16 exits through the actuator 20 from its initial position into its mesh position, and thereby can enter the associated shift gate 14 with the assistance of the associated transition area. If once again the entry area of the shift gate 14 and the shift pin 16 in a circumferential direction do not overlap, the shift pin 16 initially makes contact on the outer diameter of the ring-shaped body 8 and, after a defined turning of the ring-shaped body 8, then overlaps with the transition area, such that it can slide into the shift gate 14.

Since the shift gate 14 is thereby designed to run opposite to the shift gate 15, in the interaction with the fixed position of the shift pin 16, an axial displacement of the shift element 7 is forced in the direction of its neutral position, whereas the ball 23 thereby also slides out of the locking recess 26. Thereby, in the course of the axial displacement, the claw toothing 10 is separated axially from the toothing 12, by which, in turn, the shift element 7 can in turn rotate relative to the coupling body 11, and the transmission shaft 2 and the transmission shaft 5 are accordingly no longer coupled with each other.

Figure 1F:
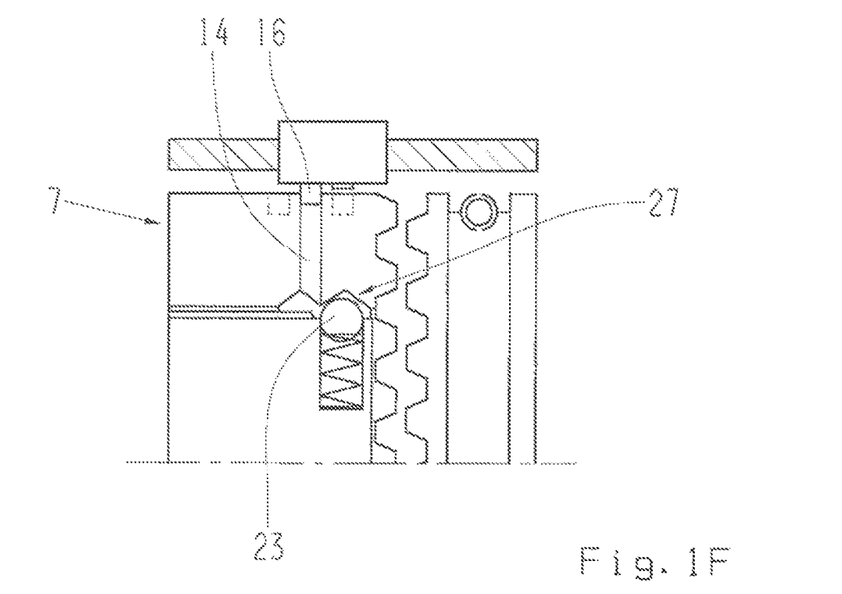

Finally, the shift element 7 thereby in turn reaches its neutral position, whereas the shift pin 16 is again pushed back through the respective transition area of the shift gate 14 into its initial position. At the same time, the ball 23 overlaps with the locking recess 27. Thus, in turn, the state shown in FIG. 1A is reached.

By means of the arrangement of a gear shifting device in accordance with the invention, shift movements of a shift element 7 may be controlled compactly, accurately and independently.

Modifications and variations can be made to the embodiments illustrated or described herein without departing from the scope and spirit of the invention as set forth in the appended claims.

The invention claimed is:

1. A gear shifting device, comprising:
a first rotatably drivable transmission component (1);
a shift element (7) arranged in a torque-proof and axially displaceable manner on the first transmission component, the shift element axially movable into a shift position in which the first transmission component (1) is coupled in a torque-proof manner with a connectable transmission component (4) that is arranged adjacent and connectable to the first transmission component;
a first shift gate (14) and a second shift gate (15) defined on an outer diameter of the shift element (7), the shift gates having an axially changing course and located axially apart from the connectable transmission component;
a first radially displaceable shift pin (16) and a second radially displaceable shift pin (17) connectable to the transmission component radially opposite to the shift gates, the shift pins displaced by an associated actuator (20) in a radial manner between an initial position and a mesh position in which the first shift pin is introduced into the first shift gate or in which the second shift pin is introduced into the second shift gate; and
wherein the shift element (7) is provided on an axial front side thereof with an axially protruding and revolving claw toothing (10) oriented towards the connectable transmission component (4).

2. The gear shifting device according to claim 1, wherein the shift pins (16,17) and the associated actuator (20) are provided on a housing (19) that radially surrounds the shift element (7).

3. The gear shifting device according to claim 2, wherein the shift pins (16,17) are provided on the actuator (20), and the two shift gates (14,15) are provided in the outer diameter of the shift element (7) and are arranged to run opposite to each other and with respective changing axial courses, wherein through introduction of the first shift pin (16) in the first shift gate (14), a shift movement of the shift element (7) from a neutral position into the shift position is brought about, and through introduction of the second shift pin (17) in the second shift gate (15), a return movement of the shift element (7) from the shift position into the neutral position is brought about.

4. The gear shifting device according to claim 1, wherein the shifting device further comprises a coupling body (11) guided in a torque-proof manner on the connectable transmission component (4) axially between the connectable transmission component and the shift element (7), the coupling body is provided with a toothing (12) corresponding to the claw toothing (10) of the shift element (7), and wherein the coupling body is coupled in an axially displaceable manner with the transmission component (4) through an intermediate spring element (13).

5. The gear shifting device according to claim 1, further comprising a locking device (21) provided radially between the shift element (7) and the first transmission component (1), the locking device preventing unintended axial movements of the shift element (7) between a neutral position and the shift position.

6. The gear shifting device according to claim 5, wherein the locking device (21) comprises a bail (23) guided in a radially movable manner, the ball preloaded against a locking contour (22) radially opposite to the ball by a spring element (25), the locking contour (22) designed as a locking recess (26) in the shift position of the shift element and a separate locking recess (27) in the neutral position of the shift element.

7. The gear shifting device according to claim 1, wherein the first transmission component (1) is a transmission shaft (2), and the connectable transmission component (4) is a different transmission shaft (5).

8. A shift element (7) for a gear shifting device according to claim 1, comprising:
a ring-shaped body (8) provided on an inner circumference thereof with toothing (9) by which the body (8) is guided in a torque-proof and axially displaceable manner by engagement with corresponding toothing (6) of the radial inner transmission component (1);
the first shifting gate (14) and the second shifting gate (15) each having axially changing courses provided on an inner diameter or an outer diameter of the body; and
wherein the respective assigned shift pins (16, 17) of an additional adjacent transmission component (18) are radially displaceable into the shift gates to axially shift the shift element between a neutral position and a shift position.

9. The shift element (7) according to claim 8, wherein the body (8) further comprises the axially protruding and revolving claw toothing (10) at the axial front side thereof.

10. The shift element (7) according to claim 8, wherein the two shift gates (14, 15) are in the outer diameter of the body (8) and run opposite to each other, the shift gates (14, 15) having a transition area with the outer diameter of the body at respective ends thereof.

* * * * *